July 13, 1948.  A. B. J. CLARK  2,444,917
SINGLE ELECTRODE HIGH SPEED RECORDING DEVICE
Filed July 9, 1945  2 Sheets-Sheet 1
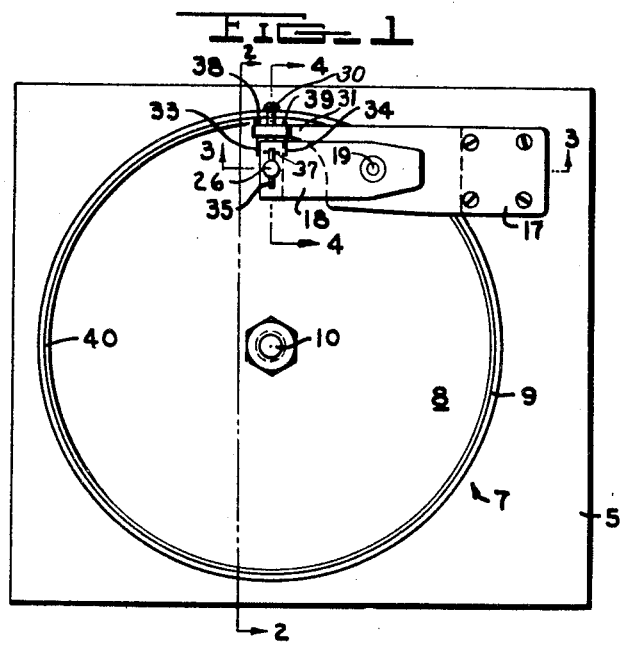
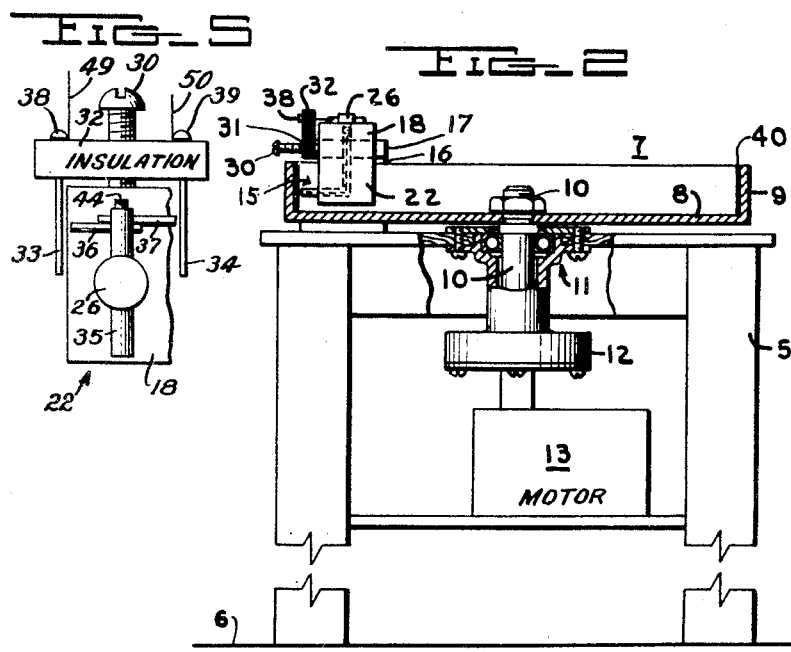
Inventor
Austin B. J. Clark
By Ralph L Chappell
Attorney July 13, 1948.     A. B. J. CLARK     2,444,917
SINGLE ELECTRODE HIGH SPEED RECORDING DEVICE
Filed July 9, 1945     2 Sheets-Sheet 2
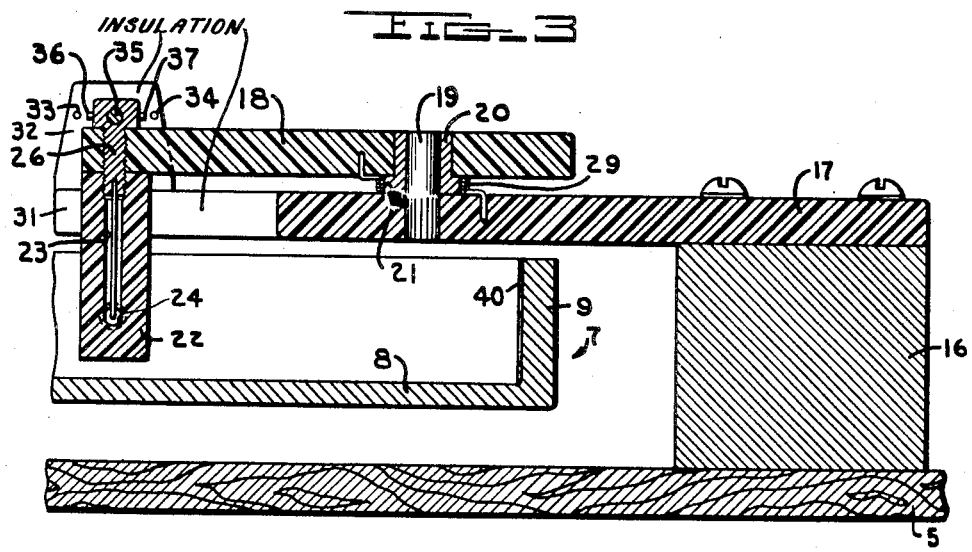
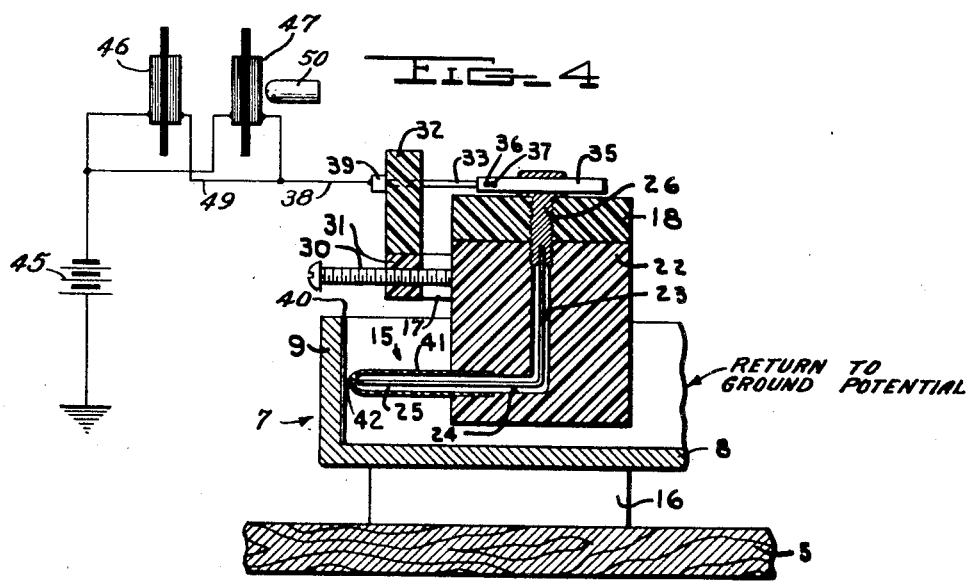
Inventor
Austin B. J. Clark
By Ralph L Chappell
Attorney Patented July 13, 1948

2,444,917

UNITED STATES PATENT OFFICE 2,444,917

SINGLE-ELECTRODE HIGH-SPEED RECORDING DEVICE

Austin B. J. Clark, Washington, D. C.

Application July 9, 1945, Serial No. 604,008

3 Claims. (Cl. 346—74)

(Granted under the act of March 3, 1883, as amended April 30, 1928; 370 O. G. 757)

This invention relates to electrical recording devices, and more particularly to an electrically controlled chronograph.

In performing certain types of tests it is necessary to know exactly the time interval between two events which may occur very closely together. For example, one method of determining the speed of a projectile is to cause the projectile to pass through two spaced screens and to determine the speed of the projectile by measuring the time interval required for the projectile to pass from the first screen to the second screen. It will be apparent that the time interval in the case of a high speed projectile will be very small even though the screens be substantially spaced and consequently it is the usual practice to employ electrical equipment to measure the time interval.

One method of measuring electrically a short time interval which is not recurrent is to employ a device known as a spark chronograph. Such a device in its simplest form may comprise a drum or cylinder which is rotated about its axis at a constant speed and which has mounted on the wall thereof a strip of paper. A spark electrode is mounted adjacent the periphery of the drum and so located that when a suitable potential is applied between the electrode and the drum, which is made of a conducting material, a spark will jump and pass through the paper, thereby producing a mark. It will be apparent that by connecting two spaced screens through a suitable source of electrical potential to the electrode and to the drum so that upon penetration of one screen a circuit is completed to cause a spark to jump, and then upon penetration of the second screen a second spark is caused to jump and thereby make a mark on the paper, two marks will be produced which will be spaced upon the paper a distance proportional to the speed of rotation of the drum and to the time interval required for the projectile to pass from the first screen to the second screen. With such apparatus, by employing a drum of a suitable diameter and having a sufficiently high peripheral speed, it is possible to measure extremely short time intervals. However, it has been found that where a very high degree of accuracy is desired, the wandering of the spark as it leaves the end of the electrode is erratic and, while slight, definitely affects the accuracy of the test.

A further object of this invention is to provide a common zero point for both sparks by utilizing a single marking electrode for both the circuits to the two screens, thus eliminating inaccuracies which may be caused by having to compensate for two different zero points resulting from the use of one marking electrode connected to one screen, and a second marking electrode connected to the second screen and hence, of necessity, spaced somewhat from the first marking electrode.

An object of the present invention is to provide an improved electrical recording apparatus and particularly an electrical recording apparatus for measuring short time intervals.

In accordance with one embodiment of this invention a rotating drum type chronograph is employed and a strip of paper is mounted around the inner wall of the drum. An electrode is mounted so that its end is closely adjacent the paper and is provided with an enclosure which restricts the area in which the spark can wander to a minimum. Means are also provided for predetermining the minimum potential which may be applied to the electrode.

Other objects and advantages of the present invention will be apparent from the following detailed description taken in conjunction with the drawings, wherein:

Fig. 1 is a plan view of an electrical interval recording apparatus constructed in accordance with one embodiment of this invention;

Fig. 2 is a vertical, sectional view taken substantially along the line 2—2 of Fig. 1;

Fig. 3 is an enlarged, fragmentary sectional view taken substantially along the line 3—3 of Fig. 1;

Fig. 4 is an enlarged, fragmentary, sectional view taken substantially along the line 4—4 of Fig. 1; and Fig. 5 is a fragmentary but enlarged view, similar to Fig. 1, showing the spark gap details.

Referring now to the drawings and particularly to Figs. 1 and 2 thereof, it will be seen that this apparatus includes a cabinet or housing 5, which may be of substantially rectangular parallelepiped shape, and which is mounted on a suitable base 6. A drum, designated generally as 7 and comprising a circular flat plate 8 having a cylindrical wall 9 extending upwardly at right angles from the periphery thereof, is mounted on a rotatable shaft 10. The shaft 10 is supported by a bearing assembly designated generally as 11, and shown in Fig. 2, the lower end of the shaft being connected through a coupling device 12 to a motor 13.

In the operation of this apparatus, the drum 7 is rotated relatively to an electrode assembly 15 which is mounted adjacent the inner side of the cylindrical wall 9 of the drum, the end of the electrode being slightly spaced from the surface of the wall. The support for the electrode assembly 15 may be any suitable rigid support whereby the end of the electrode may be accurately spaced a predetermined distance from the inner wall of the drum. It has been found that the support, shown in detail in Figs. 3, 4 and 5, however, is particularly satisfactory. This support comprises a block 16 which is mounted on the upper surface of the cabinet 5 and slightly spaced from the periphery of the drum 7. The block 16 is made sufficiently high so that a plate 17 mounted on the upper surface thereof may extend over the upper surface of the drum, as shown in Fig. 3. Since it is desirable from an operating standpoint that the electrode 15 be readily movable away from the drum side-wall to permit removal and insertion of paper, a second plate 18 is pivotally supported on the upper side of the plate 17 on a short stub shaft 19. As shown in Fig. 3 the stub shaft 19 is fixed to the plate 17 and extends upwardly therefrom through a sleeve bearing 20 mounted transversely in the plate 18, the bearing 20 being provided with a flange 21 on which the upper plate 18 rests. The plate 18 is preferably made of an electrical insulating material and an electrode housing block 22 of similar insulating material, is, as shown in Fig. 3, mounted on the under side of the left end of the plate 18.

Referring to Fig. 4 it will be seen that the housing block 22 is provided with a vertically disposed aperture 23 which extends to a point somewhat spaced from the base of the block 22 and there connects to a horizontally disposed aperture 24, which extends at right angles to the aperture 23, and the open end of which is adjacent the inner wall of the drum 7. A rod shaped single marking electrode 25, which is bent at right angles substantially at its midpoint, is positioned in the apertures 23 and 24 and extends therethrough, the upper portion of the single marking electrode 25, which is disposed in the aperture 23, being connected to an externally threaded insert 26 of electrically conducting material while the lower end of the single marking electrode 25, that is the portion which is disposed in the aperture 24, extends to the left, as viewed in Fig. 4, to a point adjacent the inner wall of the drum, the end of the single marking electrode being slightly spaced from the side wall of the drum.

As hereinbefore stated, the plate 18 is pivotally supported on the plate 17 by the stub shaft 19. In order to bias the plate 18 to cause it to urge the electrode assembly 15 toward the inner side of the drum wall, a small helical spring 29 is mounted around the flanged portion 21 of the shaft 19, intermediate the plate 18 and plate 17, as clearly illustrated in Fig. 3, to cause the plate 18 to tend to move in a clockwise direction as viewed in Fig. 1.

The spacing between the end of the electrode assembly 15 and the inner side of the cylinder wall 8 is determined by the adjustment of a set screw 30 which is threaded transversely through an extended portion 31 of the plate 17, the extended portion 31 being integrally formed with the left portion of the plate 17 as viewed in Figs. 1 and 3 and being substantially narrower in width so that it extends along the left side of the electrode supporting block 22, as viewed in Fig. 4. The set screw 30 bears against the side of the block 22.

While it is feasible to connect the potential source 45 directly to the electrode assembly 15, it has been found desirable, in accordance with this invention, to provide a spark gap intermediate the electrode assembly 15 and the potential source in order to apply a maximum potential between the electrode 25 and the drum 7. By so doing, the spacing between the end of the single marking electrode 25 and the inner side of the wall 8 may be held to a minimum, thus reducing the tendency of the spark to wander while insuring that a sufficiently high potential will be obtained to provide the required mark. As shown in the drawings, and particularly in Figs. 2, 4 and 5 thereof, a block 32 of electrical insulating material is mounted on the upper side, as viewed in these drawings, of the extended portion 31 of the plate 17. A pair of spaced electrodes 33 and 34, shown in Figs. 1 and 5, extend transversely through this block, and their right ends, as viewed in Fig. 4 extend substantially beyond the side of the block 32. A rod 35 of conducting material extends transversely through the upper portion of the insert 26, which connects to the single marking electrode 25, and is rigidly mounted therein. The left end of the rod 35 extends to a point substantially intermediate between the right ends, as viewed in Fig. 4 and shown in Figs. 1 and 5, of the electrodes 33 and 34, and a pair of electrode pins 36 and 37 are mounted transversely through the left portion thereof as viewed in Fig. 4, and shown in Figs. 1 and 5. These pins are adjustably held by set screw 44 with respect to the rod 35 so that an outer end of pin 36, as shown in Figs. 1 and 5, may be moved adjacent the side of the electrode 33, while the outer end of the other pin 37, as shown in Figs. 1 and 5, may be moved adjacent the side of the electrode 34. Terminals 38 and 39 are associated with the electrodes 33 and 34 respectively, and the terminals may be connected to a suitable source of high voltage potential, shown diagrammatically at 45, and through that source of high voltage potential to a device or screw 46 or 47 whereby a circuit may be completed upon the occurrence of an event through the high voltage source to apply a potential to the terminals. It will be understood that the drum 7 is grounded as indicated by legend in Fig. 4, thus completing the circuit through leads 49 or 50. By adjusting the spacing between the electrodes 33 and 34 and the pins 36 and 37, respectively, it will be apparent that the air gap therebetween may be increased or decreased. By making the air gap greater, the minimum voltage which will cause a spark to arc across the gap is, of course, increased and the minimum potential applied to the single marking electrode 25 and the drum 7 predetermined. Thus the single marking electrode 25 may be positioned close to the side wall 9 of the drum and yet a spark of any desired intensity be produced between the single marking electrode 25 and the side wall 9.

In employing the described apparatus in making a test, a strip or tape 40 of paper or other suitable material, which may be readily marked by an electric spark, is mounted on the inner side of the cylindrical wall. A lead, shown at 49 and 50, is connected from each of the terminals 38 and 39 to a suitable voltage potential source 45, and through the voltage potential source to a suitable tripping device, as, for example, a screen 46 or 47 which when punctured by projectile 50, completes a circuit to the potential source.

In practice, it has been found that it is desirable when high voltages are being employed, to employ shielded leads between the terminals 38 and 39 and the voltage source. In addition to reducing electrical losses from the leads, this permits the leads to serve as capacitances and potential accumulates capacitively in the leads until a sufficient potential is accumulated to cause a spark to arc from one of the associated electrodes 33 and 34 to one of the pins 36 or 37.

While by virtue of the intermediate spark gap the distance between the end of the single marking electrode 25 and the side of the drum 6 may be substantially reduced over that ordinarily employed and consequently wandering of the spark held to a minimum, in accordance with this invention, wandering of the spark may also be reduced by employing a tubular enclosure 41, shown in Fig. 4, around the electrode wire. As viewed in this figure, the right end of the enclosure is inserted in a widened portion of the aperture 24 while the left portion is tapered inwardly so that a small aperture 42 is provided just beyond the end of the electrode wire and intermediate the wire end and the side of the drum. This restricted orifice effectively minimizes wandering of the spark.

Where herein the various parts of the invention have been referred to as being located in a right or left, or upper or lower position, it will be understood that this is done solely for the purpose of facilitating description and the references relate only to the relative positions of the parts as shown in the accompanying drawings.

While but one embodiment of this invention has been shown and described, it will be understood that many changes and modifications may be made therein without departing from the spirit or scope of the present invention.

The invention shown and described herein may be manufactured or used by or for the Government of the United States of America for governmental purposes without the payment of any royalties thereon or therefor.

What is claimed is:

1. An electrical interval recording device comprising a support for a record receiving material, said support being formed of electrically conductive material, a single marking electrode positioned adjacent to said support and spaced therefrom, means for effecting relative movement between said support and said electrode while maintaining a constant spacing therebetween, electrode means connected with the marking electrode, at least two input electrode means spaced in arcing relation to the said electrode means and beyond arcing distance from each other, and circuit means feeding each input electrode separately whereby each may record through the marking electrode selectively and independently of the other.

2. An electrical interval recording device comprising a support for a record receiving material, a single marking electrode positioned adjacent to said support, at least two input electrode means spaced in arcing relationship to the said electrode, and circuit means feeding each input electrode separately whereby each may record through the marking electrode selectively and independently of the other.

3. An electrical recording device comprising a single marking electrode, at least two input electrode means spaced in arcing relationship to said electrode, and circuit means feeding each input electrode independently.

AUSTIN B. J. CLARK.

REFERENCES CITED

The following references are of record in the file of this patent:

UNITED STATES PATENTS

| Number | Name | Date |
| --- | --- | --- |
| 1,221,780 | Wald | Apr. 3, 1917 |
| 1,376,890 | Loomis et al. | May 3, 1921 |
| 1,409,304 | Loomis | Mar. 14, 1922 |
| 1,413,140 | Sutherlin | Apr. 18, 1922 |
| 1,418,996 | Warrington | June 6, 1922 |
| 1,585,486 | Getchell | May 18, 1926 |
| 1,651,074 | Steffens | Nov. 29, 1927 |
| 1,959,699 | Wappler | May 22, 1934 |
| 2,003,680 | De Forest | June 4, 1935 |

FOREIGN PATENTS

| Number | Country | Date |
| --- | --- | --- |
| 191,322 | Switzerland | Aug. 16, 1937 |